United States Patent
Lee et al.

(10) Patent No.: US 9,245,574 B2
(45) Date of Patent: *Jan. 26, 2016

(54) OPTICAL DISC DRIVE HAVING A TRAY WITH GUIDE SUPPORTS AND MAIN CIRCUIT BOARD

(75) Inventors: Hyun-woo Lee, Suwon-si (KR); Hag-Ryeol Kim, Yongin-si (KR); Min-shik Roh, Seoul (KR); Young-woo Back, Suwon-si (KR)

(73) Assignee: TOSHIBA SAMSUNG STORAGE TECHNOLOGY KOREA CORPORATION, Suwon-Si (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/329,539

(22) Filed: Dec. 19, 2011

(65) Prior Publication Data

US 2012/0174132 A1 Jul. 5, 2012

(30) Foreign Application Priority Data

Dec. 30, 2010 (KR) .................. 10-2010-0139345

(51) Int. Cl.
*G11B 17/056* (2006.01)
*G11B 7/085* (2006.01)

(52) U.S. Cl.
CPC .......... *G11B 17/056* (2013.01); *G11B 7/08582* (2013.01)

(58) Field of Classification Search
CPC .. G11B 17/03; G11B 17/056; G11B 17/0565; G11B 7/0857; G11B 7/08582; G11B 33/122–33/124

USPC ............... 720/600, 601, 648–653, 671, 672, 720/676–680

See application file for complete search history.

(56) References Cited

U.S. PATENT DOCUMENTS

| | | | |
|---|---|---|---|
| 6,782,546 B2 | 8/2004 | Kato et al. | |
| 2001/0036145 A1* | 11/2001 | Otani et al. | 369/219 |
| 2004/0205785 A1* | 10/2004 | Takahashi et al. | 720/601 |
| 2006/0005212 A1* | 1/2006 | Ichinose et al. | 720/600 |
| 2006/0123438 A1* | 6/2006 | Toyama et al. | 720/674 |
| 2008/0074976 A1* | 3/2008 | Nishikawa et al. | 369/53.17 |
| 2008/0295123 A1* | 11/2008 | Fujimoto et al. | 720/649 |
| 2010/0182888 A1* | 7/2010 | Aoki et al. | 369/100 |

FOREIGN PATENT DOCUMENTS

| | | |
|---|---|---|
| JP | 2004-152436 | 5/2004 |
| JP | 2008-010087 | 1/2008 |
| KR | 10-324993 B1 | 2/2002 |
| KR | 10-2005-0087282 | 8/2005 |
| KR | 10-0844534 B1 * | 7/2008 |

OTHER PUBLICATIONS

English translation of KR 10-0844534 B1.*
Korean Office Action issued Oct. 19, 2012 issued in Korean Patent Application No. 10-2010-0139345 (4 pages, in Korean).

* cited by examiner

*Primary Examiner* — Nathan Danielsen
(74) *Attorney, Agent, or Firm* — NSIP Law

(57) ABSTRACT

An optical disk drive including: a housing; a tray installed in the housing; an optical pickup unit mounted in the tray; and a guide shaft mounted in the tray such that the optical pickup unit and the guide shaft are configured such that the optical pickup unit is reciprocally movable along the guide shaft.

21 Claims, 6 Drawing Sheets

OPTICAL DISC DRIVE HAVING A TRAY WITH GUIDE SUPPORTS AND MAIN CIRCUIT BOARD

CROSS-REFERENCE TO RELATED PATENT APPLICATION

This application claims the benefit of Korean Patent Application No. 10-2010-0139345, filed on Dec. 30, 2010, in the Korean Intellectual Property Office, the entire disclosure of which is incorporated herein by reference for all purposes.

BACKGROUND

1. Field

The following description relates to an optical disc drive, and additionally, to an optical disc drive that includes a tray and an optical pickup unit having improved structures.

2. Description of the Related Art

In general, a slim type optical disc drive used in laptop computers includes a housing (e.g., a body) that is configured to receive a tray which is configured to receive a disc. A slim type optical disc drive includes a tray installed in the housing. In addition, a slim type optical disc drive includes an optical pickup unit installed in a tray, and a main printed circuit board (PCB) that is configured to control the optical pickup unit. The optical pickup unit and the main printed circuit board are installed in the housing. Because the optical disc drive must comply with predetermined standards in order to maintain the compatibility with general laptop computers, the freedom of designing optical disc drives is limited. According to the conventional art, an optical pickup unit is separately mounted in a tray. This optical pickup unit includes a base on which a guide shaft is installed and a main body that is mounted on the guide shaft and that reciprocally moves with respect to the metal base. Structurally, the optical pickup unit is a single, integrated element having a complicated structure, and the base thereof is mostly formed of a metal plate.

SUMMARY

In one general aspect, there is provided an optical disc drive. The optical disc drive includes a housing, a tray installed in the housing, an optical pickup unit mounted to the tray, and a guide shaft mounted to the tray, wherein the guide shaft and the optical pickup unit are configured such that the optical pickup unit is reciprocally movable along the guide shaft.

The optical disc drive may include a transport device that is mounted to the tray, wherein the transport device is configured to transport the optical pickup unit.

The optical disc drive may include a support post that is integrally formed to protrude from the tray, wherein the support post is configured to support the guide shaft.

The optical disc drive may include a main printed circuit board (PCB) that is connected to the optical pickup unit, wherein the main PCB is mounted to the tray.

The optical disc drive may include a connector that is included in the housing, wherein the connector is configured to connect to an external device, and the connector is electrically connected to the main PCB mounted to the tray.

The optical disc drive may include a main PCB that is connected to the optical pickup unit, wherein the main PCB is mounted to the tray.

The optical disc drive may include a connector that is included in the housing, wherein the connector is configured to connect to an external device, and the connector is electrically connected to the main PCB mounted to the tray.

The optical disc drive may be installed in an electronic device. The electronic device is device is one of a portable game console, a portable/personal multimedia player (PMP), a portable lap-top PC, a desktop PC, a high definition television (HDTV), an optical disc player, and an optical disc recorder.

In another aspect, there is provided an optical disc drive. The optical disc drive includes a housing, a tray installed in the housing, an optical pickup unit mounted to the tray, a guide shaft mounted to the tray; and a spindle motor mounted to the tray, the spindle motor comprising a rotation axis that is directly fixed to the tray, wherein the guide shaft and the optical pickup unit are configured such that the optical pickup unit is reciprocally movable along the guide shaft.

The optical disc drive may include a support post that is integrally formed to protrude from the tray, wherein the support post is configured to support the guide shaft.

The optical disc drive may include a main PCB that is connected to the optical pickup unit, wherein the main PCB is mounted to the tray.

The optical disc drive may include a connector that is included in the housing, wherein the connector is configured to connect to an external device, and the connector is electrically connected to a circuit board mounted to the tray.

The optical disc drive may be installed in an electronic device. The electronic device is device is one of a portable game console, a portable/personal multimedia player (PMP), a portable lap-top PC, a desktop PC, a high definition television (HDTV), an optical disc player, and an optical disc recorder.

In another aspect, there is provided an optical disc drive. The optical disc drive includes a housing comprising a base and a cover disposed on the base, a tray installed in the housing, the tray being configured to slide into and out of the housing, an optical pickup unit mounted to the tray, a guide shaft mounted to the tray, and a spindle motor mounted in the tray, wherein a rotation axis of the spindle motor is directly fixed to the tray, wherein the guide shaft and the optical pickup unit are configured such that the optical pickup unit is reciprocally movable along the guide shaft.

The optical disc drive may include a support post that is integrally formed to protrude from the tray, wherein the support post is configured to support the guide shaft.

The optical disc drive may include a main PCB that is connected to the optical pickup unit, wherein the main PCB is mounted to the tray.

The optical disc drive may include a connector that is included in the housing, wherein the connector is configured to connect to an external device, and the connector is electrically connected to a circuit board mounted to the tray.

The optical disc drive may be installed in an electronic device. The electronic device is device is one of a portable game console, a portable/personal multimedia player (PMP), a portable lap-top PC, a desktop PC, a high definition television (HDTV), an optical disc player, and an optical disc recorder.

Other features and aspects may be apparent from the following detailed description, the drawings, and the claims.

Figure 1:
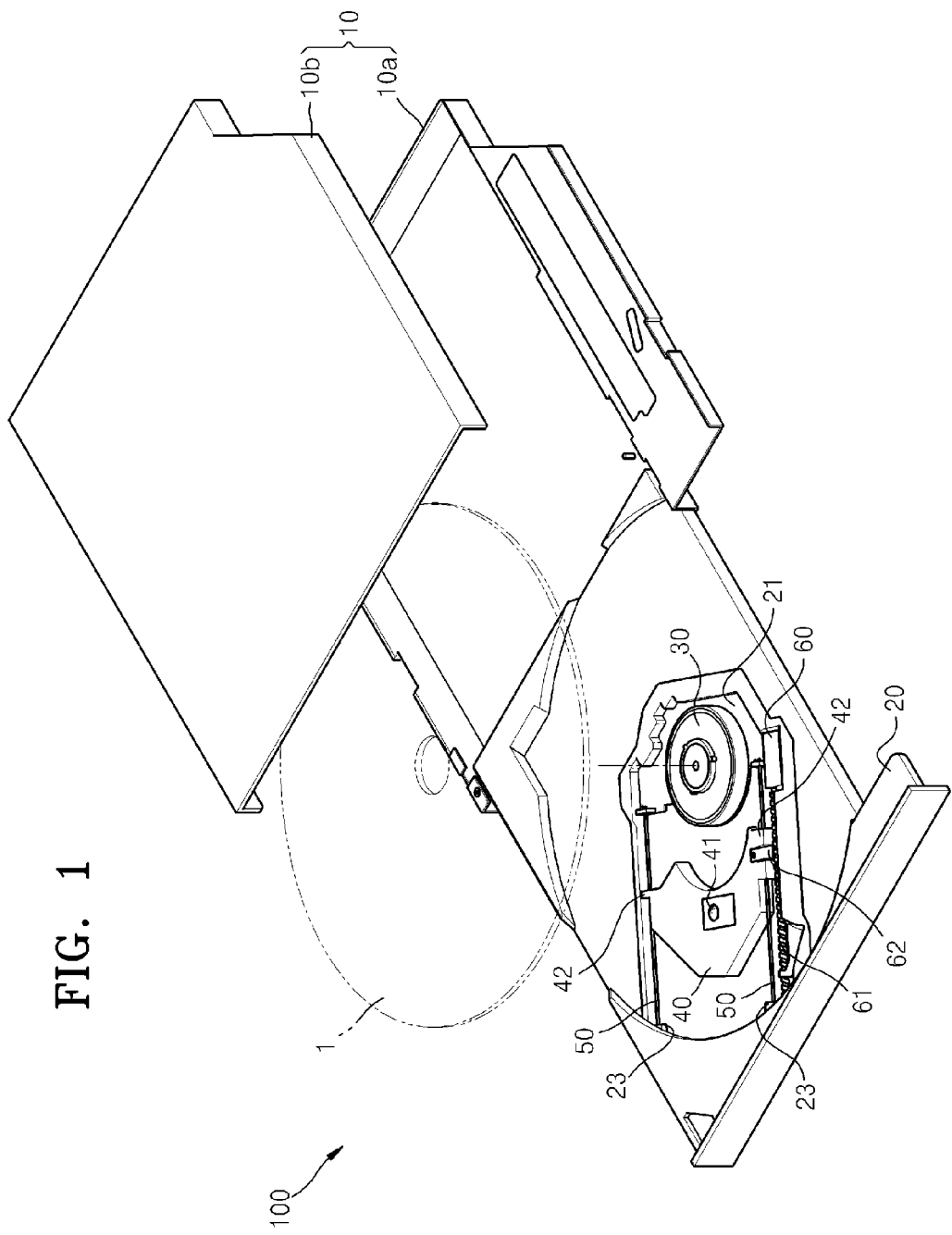
FIG. 1 is a drawing illustrating an example of an optical disc drive.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a schematic perspective view illustrating an optical disc drive 100.

Referring to FIG. 1, a tray 20 is operatively coupled to a housing 10 having a base 10a and a cover 10b. The tray 20 is installed in the housing 10 so as to facilitate the insertion and ejection of the tray 20. In other words, the tray 20 is of a sliding type and slides into and/or out of the housing 10. The tray 20 has mounted thereon a spindle motor 30 and an optical pickup unit 40. The tray 20 may be configured to receive a disc 1. In addition, the spindle motor 30 and the optical pickup unit 40 may be configured to allow for the mounting of a disc 1 thereto. The optical pickup unit 40 is installed on two guide shafts 50 which are fixed in the tray 20. The optical pickup unit 40 includes an object lens 41 and an actuator (not shown) which is configured to drive the object lens 41. The optical pickup unit 40 also includes guide portions 42 that slidably move relative to the guide shafts 50 as the optical pickup unit moves. The guide portions 42 are disposed on two sides of the optical pickup unit 40. The tray may also include a transport motor 60 having a screw gear 61 that is configured to reciprocally move the optical pickup unit 40. As an example, the screw gear 61 is in tooth meshing with a screw coupling portion 62 which is operatively coupled to the optical pickup unit 40. Accordingly, the optical pickup unit 40 reciprocally moves along the guide shafts 50 according to a rotation of the screw gear 61.

Figure 2:
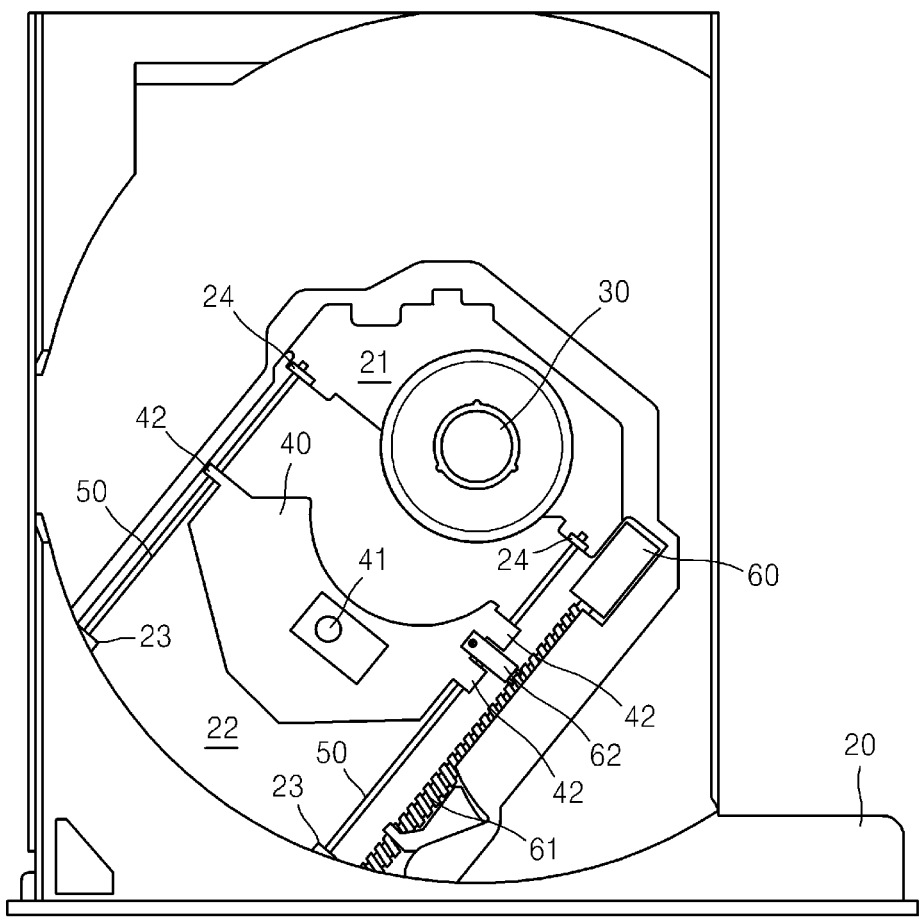
FIG. 2 is a drawing illustrating an example of a planar structure of a tray of an optical disc drive such as, for example, the optical disc drive illustrated in FIG. 1.
Figure 3:
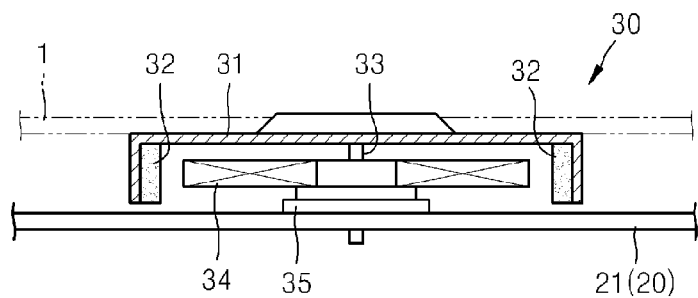
FIG. 3 is a drawing illustrating an example of a spindle motor directly mounted in a tray in an optical disc drive such as, for example, the optical disc drive illustrated in FIG. 1.

FIG. 2 illustrates a planar structure of the tray 20 of an optical disc drive such as, for example, the optical disc drive of FIG. 1. FIG. 3 is a schematic cross-sectional view illustrating the spindle motor 30 directly mounted in the tray 20 of an optical disc drive such as, for example, the optical disc drive illustrated in FIG. 1.

Referring to FIG. 2, the tray 20 includes a space 22 in which the optical pickup unit 40 is moveably installed and in which the optical pickup unit 40 reciprocates.

Guide shafts 50 are installed on two sides of the space portion 22. For example, the guide shafts 50 are disposed in parallel on two sides of the space 22. Each of the guide shafts 50 has a first end supported by supporting post 23 and a second end supported by supporting post 24. The support posts 23 and 24 are disposed on the tray. As an example, the support posts 23 and 24 may be integrally formed in the tray 20. Two ends of the optical pickup unit 40 are supported by the guide shafts 50. For example, the guide portions 42 and the screw coupling portion 62 may be operatively coupled to the guide shafts 50 to provide support to the optical pickup unit 40. The screw coupling portion 62 which is operatively engaged with the screw gear 61 of the transport motor 60, is disposed at an end of the optical pickup unit 40.

A motor base 21 serving which acts as a base of the spindle motor 30 is disposed at one side of the space portion 22 of the tray 20. The motor base 21 is integrated with the tray 20. As an example, the motor base 21 may be a portion of the tray 20.

For example, a motor base 21 of the spindle motor 30 may be disposed at an end of the space 22 of the tray 20. Referring to FIG. 3, the motor base 21 is a portion of the tray 20. An axis supporting portion 35 having a bearing (not shown) is fixed to the motor base 21. The axis supporting portion 35 is configured to support a rotation axis 33 of the spindle motor 30 is fixed to the motor base 21. A magnetic coil unit 34 is fixed on the axis supporting portion 35. The magnetic coil unit 34 is a stator. A rotator 31 is operatively coupled to the rotation axis 33. The rotator 31 has an upper surface on which the storage medium (not shown) is installed. The rotator 31 may also have at least one permanent magnet 32 installed therein. The at least one permanent magnet may be disposed on an inner side of the rotator 31. Further, as an example, the spindle motor 30 may be installed on a portion of the tray 20 so as to have a complete structure of a motor. For example, above-described structure is obtained by removing a motor base which is separately included in a conventional spindle motor and using a portion of the tray as a motor base. Accordingly, the spindle motor 30 having the above-described structure is mounted on a portion of the tray 20, thereby forming a complete motor.

Figure 4:
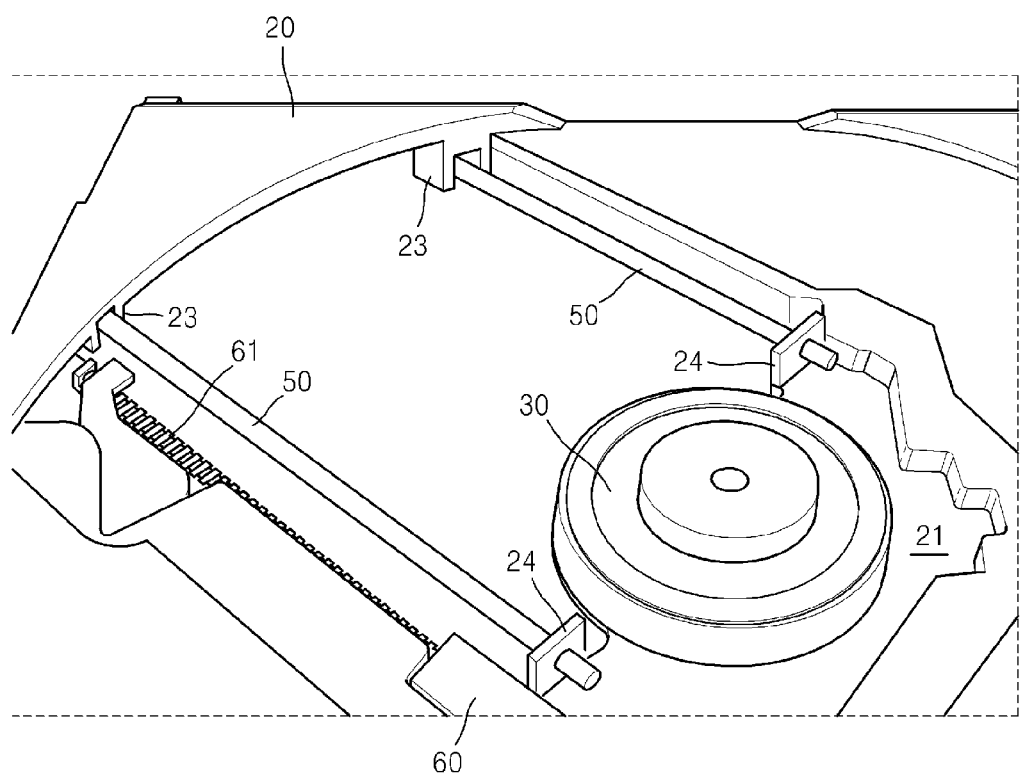
FIG. 4 is drawing illustrating an example of guide shafts and support posts supporting the guide shafts included in a tray of an optical disc drive such as, for example, the optical disc drive illustrated in FIG. 1.

FIG. 4 is a perspective view illustrating the guide shafts 50 and the support posts 23 and 24 which support the guide shafts 50 of the tray 20 of an optical disc drive such as, for example, the optical disc drive illustrated in FIG. 1.

Figure 5A:
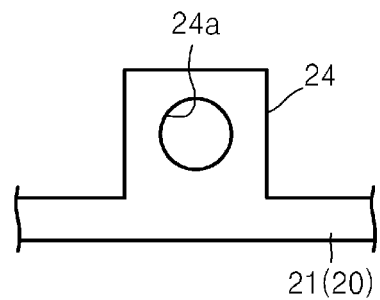
FIGS. 5A and 5B are drawings illustrating example of support posts supporting guide shafts included in a tray of an optical disc drive such as, for example, the optical disc drive illustrated in FIG. 1.
Figure 5B:
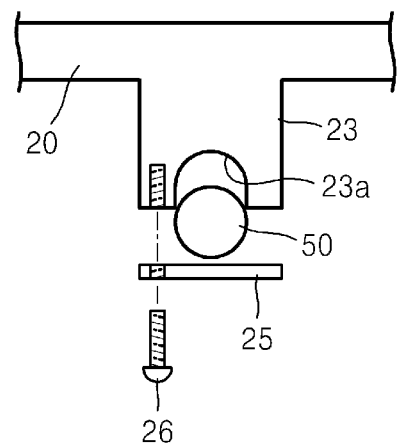

FIGS. 5A and 5B are drawings illustrating an example of portions of support posts 23 and 24 which support a guide shaft 50 of a tray of a disc drive.

For example, as illustrated in FIG. 4, the support posts 23 and 24, which are configured to support two ends of the guide shafts 50, are disposed on a portion of a lower surface of the tray 20 and at a side of the motor base 21 to enable the support posts 23 and 24 to support two ends of the guide shafts 50. As an example, the support post 24 may include a through hole 24a into which a first end of the guide shafts 50 is inserted. FIG. 5A illustrates an example of a through hole 24a in the support post 24. The support post 23 may include a saddle-shaped insertion groove 23a into which the guide shafts 50 are inserted. The guide shafts 50 may be inserted from below. FIG. 5B illustrates an example of a saddle shaped inserting groove 23a in the supporting post 23. In addition, as an example, the supporting post 23 may have a supporting member 25 operatively coupled thereto, such that the supporting member 25 prevents the guide shaft 50 from being inadvertently removed from the saddle-shaped insertion groove 23a. For example, the additional supporting member 25 may be operatively coupled to the supporting post 23 by means of a screw 26.

Figure 6:
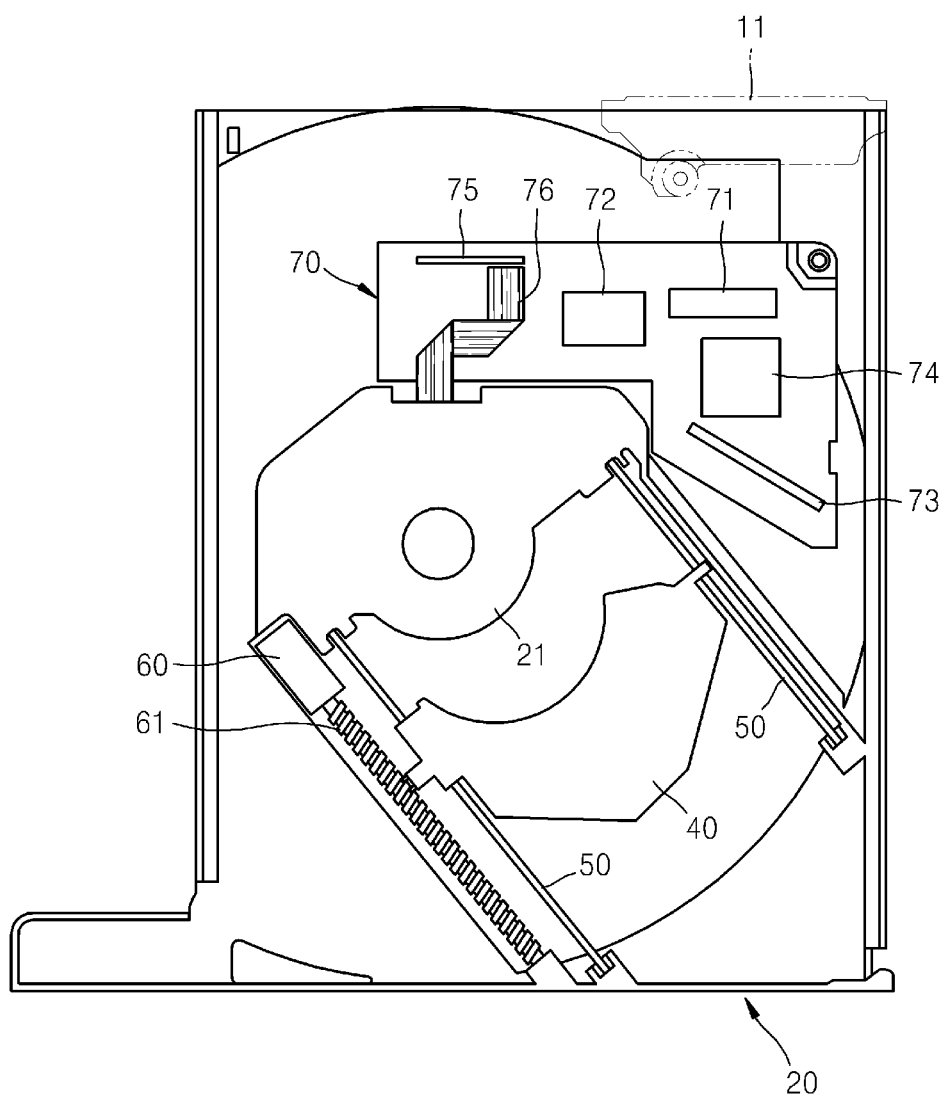
FIG. 6 is a drawing illustrating an example of an arrangement of a main printed circuit board (PCB) mounted on a bottom surface of a tray of an optical disc drive such as, for example, the optical disc drive illustrated in FIG. 1.
Figure 7:
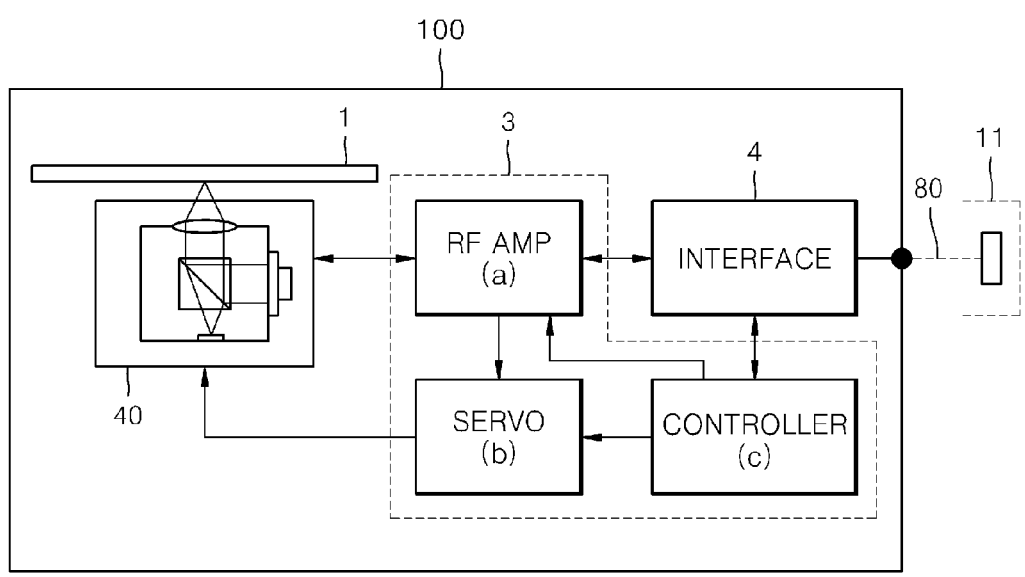
FIG. 7 is a drawing illustrating an example of a main PCB mounted in an optical disc drive such as, for example, the optical disc drive illustrated in FIG. 1.

FIG. 6 illustrates a bottom surface of the tray 20 of an optical disc drive such as, for example, the optical disc drive illustrated in FIG. 1. FIG. 7 is a drawing illustrating an example of a main PCB of an optical disc drive.

Referring to FIGS. 6 and 7, an optical disc drive may include a main printed circuit board (PCB) 70. For example, the main PCB 70 of the optical disc drive may be disposed on a lower surface of the tray 20. The main PCB 70 may be a front end system or component. For example, the main PCB 70 may include a front end part including a high frequency amplifier (RF amplifier), a servo circuit, and an interface, and the like. The main PCB 70 may include an interface connector 71, a connector 73 connected to the optical pickup unit, chip sets 72 and 74, a connector 75 connected to a spindle motor, and the like. As an example, the chipsets 72 and 74 may be microcontrollers or the like.

For example, a front end system 3 includes an RF amplifier (a) that amplifies a signal transmitted from the optical pickup unit 40, a servo unit (b) that is configured to control tracking and focusing of the optical pickup unit 40, and a control unit (c) that is configured to control the RF amplifier (a), the optical pickup unit 40, and the servo unit (b). As an example, a current/voltage amplifier may be disposed at a front end of an RF amplifier of the front end system 3. The RF amplifier may output, for example, raw-data (e.g., a signal) that is obtained by finally amplifying a high frequency signal. The RF amplifier (a) may output the signal to a master device such as a portable computer via an interface 4.

As an example, if the main PCB 70 is mounted on the bottom surface of the tray 20 as described above, it is not necessary for the housing 10 to include a conventional interface device. In other words, housing 10 may simply include a simple interface connector. As an example, the simple interface connector may include a Serial Advanced Technology Attachment (SATA) connector, or the like. Because the optical pickup unit is directly mounted in the tray, the number of components and processes required to manufacture such an optical disc drive may be reduced. In particular, because the optical pickup device may be installed on the tray without requiring a separate base, the inner space may be increased by at least as much as the thickness of a conventional base. Moreover, in contrast to a conventional optical disc drive in which a spindle motor is installed as a separate component on the tray, an example of a disc drive according to one aspect includes a spindle motor installed directly on the tray. Accordingly, the number of components and processes required to manufacture such a disc drive may be reduced. Accordingly, manufacturing costs are thereby further reduced. In a conventional optical disc drive, the spindle motor is manufactured as an independent component.

In addition, because the main PCB is mounted directly on the tray, a distance between the optical pickup unit and the main PCB is reduced, thereby reducing signal loss between the optical pickup unit and the main PCB.

In some aspects, optical disc drives are provided in which the number of components and processes for manufacturing such are reduced. Accordingly, the manufacturing costs are thereby reduced.

Disc drives as described in the above examples may be included in an electronic device. As a non-exhaustive illustration only, an electronic device described herein may refer to mobile devices such as a digital camera, a portable game console, a portable/personal multimedia player (PMP), a portable lap-top PC, and devices such as a desktop PC, a high definition television (HDTV), an optical disc player, a set top box, and the like which may be capable of wireless communication or network communication.

The units described herein may be implemented using hardware components and software components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the examples disclosed herein can be easily construed by programmers skilled in the art to which the examples pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical disc drive, the optical disc drive comprising:
a housing;
a tray installed in the housing;
an optical pickup unit mounted to a bottom surface of the tray;

a motor base for a spindle motor directly fixed to the tray wherein the motor base is a first portion of the tray;

a guide shaft mounted to the tray via a first support post and a second support post, wherein the second support post is integrally formed on an edge of the first portion of the tray, and the first support post is integrally formed on a second portion of the tray; and a circuit board mounted to the bottom surface of the tray, wherein:

the guide shaft and the optical pickup unit are configured such that the optical pickup unit is reciprocally movable along the guide shaft, a saddle-shaped groove within the first support post receives the guide shaft, and a supporting member coupled directly to the first support post fixes the guide shaft between the supporting member and the saddle-shaped groove.

2. The optical disc drive of claim 1, further comprising a transport device that is mounted to the tray, wherein the transport device is configured to transport the optical pickup unit.

3. The optical disc drive of claim 1, wherein the second support post is integrally formed to protrude from the tray.

4. The optical disc drive of claim 1, wherein the circuit board is a main printed circuit board (PCB) that is connected to the optical pickup unit.

5. The optical disc drive of claim 4, further comprising a connector that is included in the housing, wherein the connector is configured to connect to an external device, and the connector is electrically connected to the main PCB mounted to the tray.

6. The optical disc drive of claim 1, wherein the circuit board is a main PCB that is connected to the optical pickup unit and is configured to reduce signal loss between the optical pickup unit and the PCB.

7. The optical disc drive of claim 6, further comprising a connector that is included in the housing, wherein the connector is configured to connect to an external device, and the connector is electrically connected to the main PCB mounted to the tray.

8. The optical disc drive of claim 1, wherein the housing excludes a PCB directly mounted thereto.

9. The optical disc drive of claim 1, wherein the optical disk drive is installed in an electronic device, wherein the electronic device is one of a portable game console, a portable/personal multimedia player (PMP), a portable lap-top PC, a desktop PC, a high definition television (HDTV), an optical disc player, and an optical disc recorder.

10. The optical disc drive of claim 1, wherein the second support post is operatively coupled to a supporting member via a fixing means and the guide shaft rests on the supporting member.

11. An optical disc drive, the optical disc drive comprising:
a housing;
a tray having a space portion and installed in the housing;
an optical pickup unit mounted to the tray;
a spindle motor having a rotation axis;
a motor base for supporting the spindle motor disposed at one side of the space portion and directly fixed to the tray, wherein the motor base is a first portion of the tray;
a guide shaft mounted to the tray via a first support post and a second support post, wherein the second support post is integrally formed on an edge of the first portion of the tray, and the first support post is integrally formed on a second portion of the tray; and
a main printed circuit board (PCB) mounted to the bottom surface of the tray, wherein:
the guide shaft and the optical pickup unit are configured such that the optical pickup unit is reciprocally movable along the guide shaft,
a saddle-shaped groove within the first support post receives the guide shaft, and
a supporting member coupled directly to the first support post fixes the guide shaft between the supporting member and the saddle-shaped groove.

12. The optical disc drive of claim 11, wherein the second support post is integrally formed to protrude from the tray and is configured to support the guide shaft.

13. The optical disc drive of claim 11, wherein the main PCB is connected to the optical pickup unit and configured to reduce signal loss between the optical pickup unit and the PCB.

14. The optical disc drive of claim 13, further comprising a connector that is included in the housing, wherein the connector is configured to connect to an external device, and the connector is electrically connected to the PCB mounted to the tray.

15. The optical disc drive of claim 11, wherein the housing excludes a PCB directly mounted thereto.

16. The optical disc drive of claim 11, wherein the optical disk drive is installed in an electronic device, wherein the electronic device is one of a portable game console, a portable/personal multimedia player (PMP), a portable lap-top PC, a desktop PC, a high definition television (HDTV), an optical disc player, and an optical disc recorder.

17. An optical disc drive, the optical disc drive comprising:
a housing comprising a base and a cover disposed on the base;
a tray installed in the housing, the tray being configured to slide into and out of the housing;
an optical pickup unit mounted to a bottom surface of the tray;
a motor base for a spindle motor directly fixed to the tray, wherein the motor base is a first portion of the tray;
a guide shaft mounted to the tray via a first support post and a second support post, wherein the second support post is integrally formed on an edge of the first portion of the tray, and the first support post is integrally formed on a second portion of the tray; and
a main printed circuit board (PCB) mounted to the bottom surface of the tray, wherein:
the guide shaft and the optical pickup unit are configured such that the optical pickup unit is reciprocally movable along the guide shaft,
a saddle-shaped groove within the first support post receives the guide shaft, and
a supporting member coupled directly to the first support post fixes the guide shaft between the supporting member and the saddle-shaped groove.

18. The optical disc drive of claim 17, wherein the second support post is integrally formed to protrude from the tray and is configured to support the guide shaft.

19. The optical disc drive of claim 17, wherein the main PCB is connected to the optical pickup unit and configured to reduce signal loss between the optical pickup unit and the PCB.

20. The optical disc drive of claim 19, further comprising a connector that is included in the housing, wherein the connector is configured to connect to an external device, and the connector is electrically connected to the PCB mounted to the tray.

21. The optical disc drive of claim 17, wherein the housing excludes a PCB directly mounted thereto.

* * * * *